July 13, 1954  C. A. ELLIS  2,683,392
LENS TESTING INSTRUMENT
Filed Dec. 18, 1950  5 Sheets-Sheet 1

INVENTOR
CHARLES A. ELLIS
BY
Louis L. Gagnon
ATTORNEY

July 13, 1954　　　　C. A. ELLIS　　　　2,683,392
LENS TESTING INSTRUMENT
Filed Dec. 18, 1950　　　　　　　　　　　　5 Sheets-Sheet 2

INVENTOR
CHARLES A. ELLIS
BY
ATTORNEY

July 13, 1954

C. A. ELLIS 2,683,392

LENS TESTING INSTRUMENT

Filed Dec. 18, 1950

INVENTOR
CHARLES A. ELLIS
BY
*Louis L. Gagnon*
ATTORNEY

July 13, 1954 C. A. ELLIS 2,683,392
LENS TESTING INSTRUMENT
Filed Dec. 18, 1950 5 Sheets-Sheet 5

INVENTOR
CHARLES A. ELLIS
BY
Louis L. Gagnon
ATTORNEY

Patented July 13, 1954

2,683,392

UNITED STATES PATENT OFFICE 2,683,392

LENS TESTING INSTRUMENT

Charles A. Ellis, Southbridge, Mass., assignor to American Optical Company, Southbridge, Mass., a voluntary association of Massachusetts Application December 18, 1950, Serial No. 201,404

7 Claims. (Cl. 88—56)

This invention relates to instruments for use in determining the optical characteristics of lenses and has particular reference to the provision of an instrument for measuring the dioptric power and magnification of lenses either as separate or combined factors.

One of the primary objects of this invention is to provide a simple, compact, inexpensive and efficient optical instrument for measuring the dioptric power and magnification factors of lenses, whereby the resultant instrument will require a minimum of space and will have its operative parts conveniently located for ease of manipulation.

Another object is to provide an instrument of the above character embodying means for directing light rays along a controlled path through an article such as a lens to be tested and located at a given position relative to a fixed reference point, means for angling the lens in opposite directions in controlled amounts relative to said path, and means for measuring the range of deviation of said light rays from said controlled path as affected by said angling for the purpose of measuring the magnification characteristics of the lens.

A further object is to provide, in an instrument of the above character, improved means for supporting an article such as a lens having toric surfaces in such a manner that one major axis of the article may be initially located in a given meridian and the said article may then be rotated ninety degrees with respect to said given meridian, said means also being adjustable longitudinally of the optical system, if desired, for permitting measurements of magnification at different given selected positions.

Other objects and advantages will become apparent from the following description taken in connection with the accompanying drawings, in which.

The principles and theories of this invention are clearly explained in U. S. patent application No. 2,114,282 issued to A. Ames, Jr., et al. on April 19, 1938. Broadly, an instrument embodying the present invention is used for the purpose of measuring the deviations by a lens of light rays coming to the eye from various points of a field, or, in other words, to measure the amount of apparent displacement of points in a field caused by lenses interposed between the field and the eye.

A preferred embodiment of the invention is shown in the accompanying drawings wherein like characters of reference designate like parts throughout the several views. The instrument embodies a hollow base 20 to the forward end of which is adjustably connected one end of an outwardly extending upwardly curved supporting arm 21 carrying a telescope 22 at its upper end. The telescope 22 is mounted so as to be directed toward a lens supporting device 23 which is adjustably mounted on the lower end of the supporting arm 21. Substantially coaxial with the telescope 22 on the opposite side of the lens supporting device 23 and carried by an upright portion of the rear end of the base 20 is a target holding means 24.

Figures 2, 5, 6, 7:
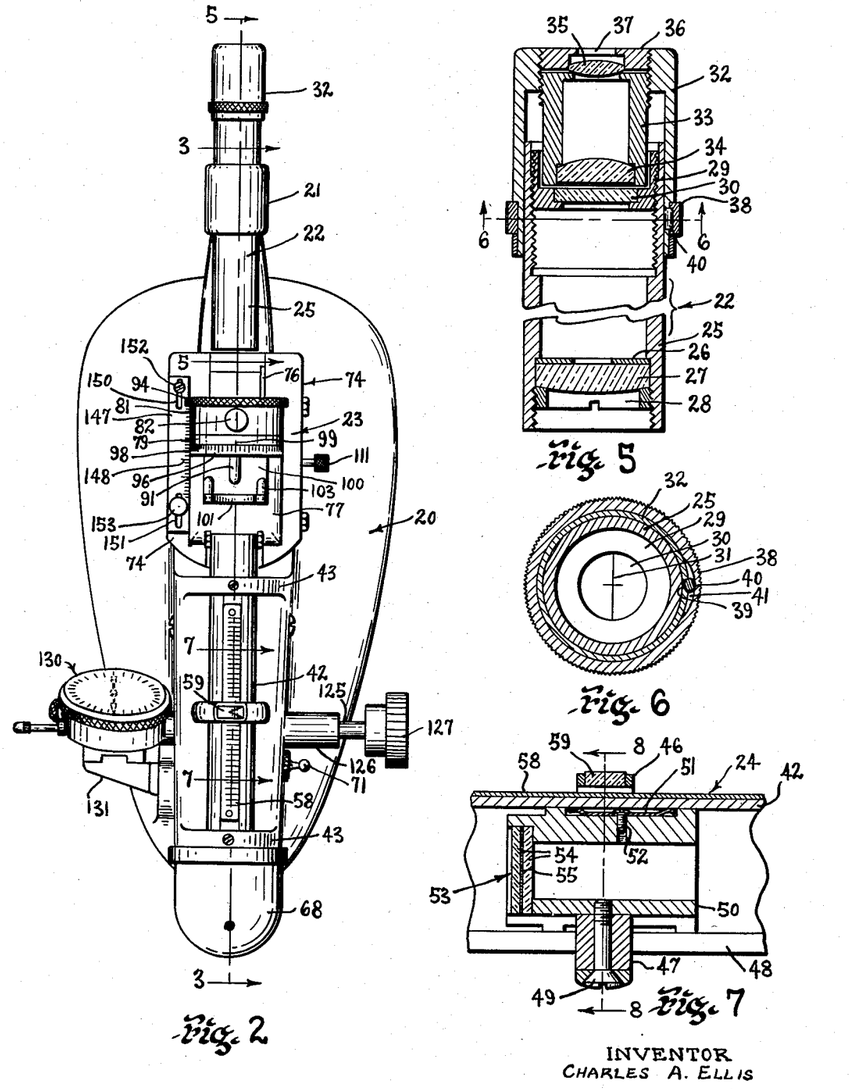
Fig. 2 is a top-plan view of the device shown in Fig. 1.
Fig. 5 is an enlarged sectional view of the telescope taken on line 5—5 of Fig. 2 looking in the direction of the arrows.
Fig. 6 is an enlarged sectional view taken on line 6—6 of Fig. 5 looking in the direction of the arrows.
Fig. 7 is an enlarged sectional view taken on line 7—7 of Fig. 2 looking in the direction of the arrows.

The telescope 22 is formed with a barrel 25 having an apertured member 26 mounted therein adjacent one end. The member 26 is positioned against a shoulder formed on the inner surface of the barrel 25 and thus positively locates an objective lens 27 which has one surface positioned in engagement therewith, as shown in Fig. 5, with a retaining ring 28 threadedly inserted in the end of the barrel 25 and engaging the opposed surface of the objective lens 27 serving to retain the lens 27 and apertured member 26 in place. The opposed end of the barrel 25 is also internally threaded for reception of a threaded lens carrying ring 29 which has a reticule 30 cemented or otherwise fixedly mounted therein. The reticule 30 is provided with crossed hairlines 31 (Fig. 6) and the ring 29 is located within the barrel 25 in such a position that the reticule 30 is spaced a predetermined distance from the objective lens 27 to provide the optical system of the telescope with the desired focal length.

Slidably mounted over the outer end of the barrel 25 is a tubular eyepiece barrel 32. The barrel 32 contains a tubular lens holding member 33, the inner end of which fixedly carries one of the eyepiece lenses 34. A second eyepiece lens 35 is positioned between the outer end of the member 33 and a retainer 36 which seals the outer end of the barrel 32. The outer periphery of the retainer 36 and adjacent end of the member 33 are threaded for mounting within the eyepiece barrel 32 and the retainer is apertured as at 37 so that light may pass through the telescope to the eye of an operator.

The eyepiece barrel 32 is adapted to slide along the telescope barrel 25 so that the eyepiece lenses may be positioned as desired with respect to the telescope reticule whereby the hairlines 31 will be clearly distinguishable to the operator. Means is provided, however, for retaining the eyepiece in adjusted position and comprises a knurled operating ring 38 which encircles the eyepiece barrel 32 and is adapted to rotate there-around within a groove formed in the barrel 32. At one point within the groove the barrel is provided with a small opening 39 permitting communication between the operating ring 38 and the telescope barrel 25. Within the opening 39 is positioned a ball or roller 40 which is engaged on diametrically opposed sides by the ring 38 and telescope barrel 25, the ring 38 being provided with an inner recessed cam surface 41 into which the roller 40 extends as shown in Fig. 6. When in this position the eyepiece may be easily moved along the telescope barrel to the desired adjusted position. To lock the eyepiece in adjusted position the operator turns the knurled ring 38 which causes one or the other side of the cam surface 41 to clamp the roller 40 tightly against the telescope barrel 25, thus rendering the eyepiece immovable.

The target holding means 24 which is normally positioned in optical axial alignment with the telescope 22 comprises a longitudinally disposed target barrel 42 (Figs. 1 and 3) the ends of which are mounted within spaced ring-like upwardly extending portions 43 of the instrument base 20.

Three spaced adjusting screws 44 are provided in each of the portions 43 for engagement with the barrel 42 so that the barrel may be assembled in aligned relation with the telescope, locking screws 45 being also provided for retaining the adjusting screws 44 in adjusted position.

A focusing ring 46 encircles the barrel 42 and is supported by a block 47 (Figs. 3 and 7) which extends upwardly through a longitudinal slot 48 in the barrel 42 and is connected as by a screw 49 to a substantially tubular shaped slidable member 50 which is fitted so as to slide longitudinally within the barrel 42 with a minimum of looseness. To retain the slidable member 50 in adjusted position within the barrel 42 is a tension device in the form of a leaf spring 51 which is secured as by a screw 52 to the member 50 and has portions thereof frictionally engaging the inner wall of the barrel.

Figure 8:
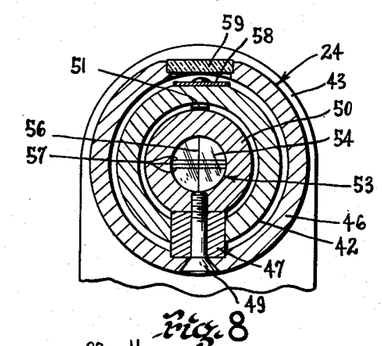
Fig. 8 is an enlarged sectional view taken on line 8—8 of Fig. 7 looking in the direction of the arrows.

The end of the slidable member 50, which is directed toward the telescope, carries a target 53 therein. The target 53 is preferably formed as a pair of transparent discs 54 (Fig. 7) placed in superimposed relation with a metal film 55 therebetween, the film being removed in places to form a transparent configuration which comprises a single vertical line 56 and three spaced horizontal lines 57 as shown in Fig. 8.

By manually moving the focusing ring 46 along the barrel 42, the operator of the instrument can adjust the target 53 with respect to the other elements of the optical system. The upper surface of the barrel 42 carries a longitudinal scale 58 (Fig. 2) and the upper portion of the focusing ring 46 carries a lens 59 having an indicator thereon for registration with the scale 58 to indicate the adjusted position of the target 53.

Figures 3, 13:
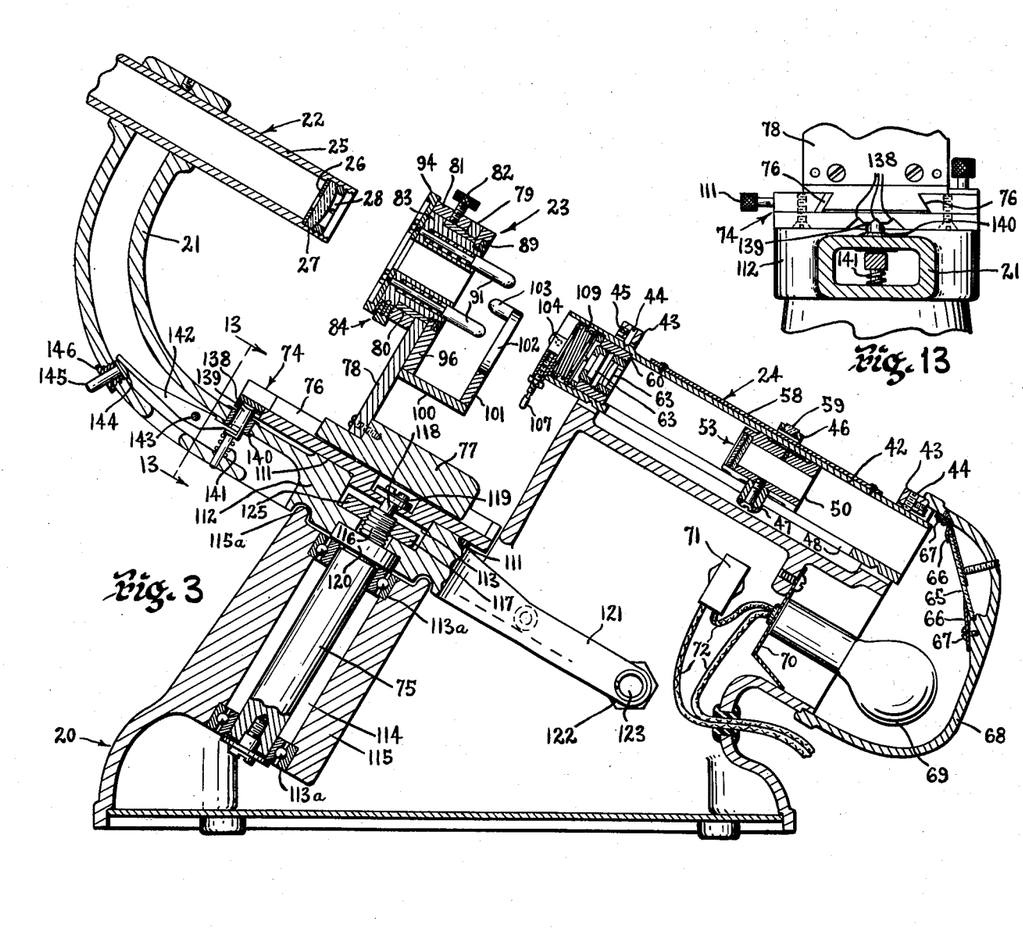
Fig. 3 is a sectional view taken on line 3—3 of Fig. 2 looking in the direction of the arrows.
Fig. 13 is an enlarged sectional view taken on line 13—13 of Fig. 3 looking in the direction of the arrows.
Figure 10:
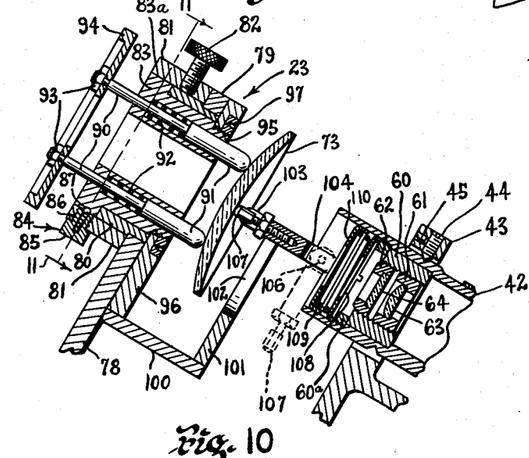
Fig. 10 is an enlarged fragmentary vertical section taken through the center of the lens supporting device and adjacent lens locating means.

The end of the target barrel 42 nearest the telescope 22 carries a fixed retainer 60 into which are threaded lens carrying rings 61 and 62 (Figs. 3 and 10). The rings 61 and 62 each carry a respective lens unit 63 and 64 comprising a standard lens system, the units of which are adjusted at assembly to determine the principal focus of the instrument. A fixed retaining ring 60a abuts the retainer 60 to maintain the lens in place. The purpose of this lens system is to project, by means of parallel light, an image of the target 53 onto the reticule 30, the light rays producing the image of the target as effected by the lens to be tested will be more fully described hereinafter.

Adjacent the opposite end of the target barrel 42 is an inclined mirror 65 which is attached as by clips 66 and screws 67 to a lamp housing 68 which is in turn attached to the base 20 over the end of the barrel 42 as shown in Fig. 3. A lamp 69 is carried by means such as a bracket 70 secured to the base 20 and is connected to a switch 71 and to a source of current (not shown) by suitable wiring 72. The lamp 69 is positioned in such a manner that rays therefrom will be reflected by the mirror 65 through the target 53, lenses 63 and 64, and telescope 22 to the eyepiece 32, all of which are properly spaced and axially aligned.

A lens 73 (Figs. 4 and 10) to be tested is adapted to be inserted in the optical system of the instrument between the telescope 22 and target 53. The supporting device 23 for this purpose embodies a plate 74 which is rotatably mounted on the upper end of a pivot member 75 (Fig. 3) carried within the base 20. The plate 74 is formed with longitudinal slide ways 76 in which is slidably positioned a supporting block 77 having attached thereto an upright 78. The upper end portion 79 of the upright 78 is provided with an opening which is substantially concentric with the axis of the optical system of the instrument in which is immovably secured a supporting ring 80 (Fig. 10).

Mounted for rotation over the supporting ring 80 is a locating ring 81 which is adapted to be locked immovably to the supporting ring 80 by means such as a thumb screw 82. A tubular retainer 83 is positioned for rotation within the supporting ring 80 and is provided with a flange portion 83a having side surface engagement with the adjacent end of the retainer 80 and has its peripheral surface engaging the inner surface of the locating ring 81. A spring detent 84 is provided in the form of a stud 85 threaded into an opening through the locating ring 81 and having a longitudinal bore therein containing a coiled spring 86 which urges a ball member 87 into one or another of a series of spaced notches 88 (Fig. 11) formed in the periphery of the flange portion 83a of the retainer 83. The notches are 90° apart and thus the action of the ball member 87 when indexing with one of notches serves to indicate to the operator a 90° rotary movement.

Figure 11:
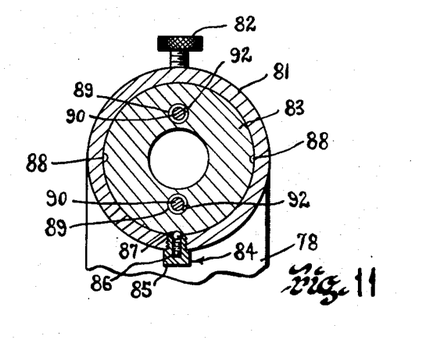
Fig. 11 is a sectional view taken on line 11—11 of Fig. 10 looking in the direction of the arrows.
Figure 12:
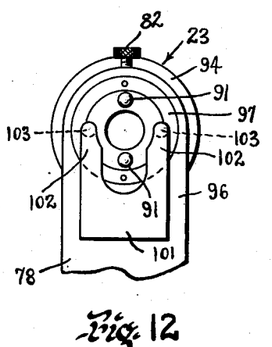
Fig. 12 is a fragmentary rear elevational view of the lens supporting means.

The retainer 83 is provided with a pair of diametrically opposed longitudinal bores 89, Fig. 11, which are spaced equidistant from and parallel with the optical axis of the system and in each of which is located a slidable rod 90. The rods 90 are shaped to slide within the bores 89 in a direction substantially parallel with the axis of the optical system and are provided with enlarged lens engaging portions 91 of a diameter greater than the diameter of the rods 90. The lens engaging portions 91 are slidable in portions of the bore 89 which are enlarged to receive said portions 91. The rods 90 are each constantly urged in a direction toward the target carrying means 24 by a coiled spring 92 positioned thereover within the respective enlarged portions of the bores 89 between inner shoulders formed by the ends of the bore in which the rods 90 are slidably mounted and the inner ends of the lens engaging portions 91.

The ends of the rods 90 which are directed toward the telescope 22 are attached as by nuts 93 or other suitable means to a disc member 94 having a knurled peripheral edge. The disc 94 can be gripped and pulled by the operator to simultaneously retract the lens engaging portions 91 of the rods 90 against the action of the springs 92 as shown in Fig. 10.

The retainer 83 is provided with a reduced threaded neck portion 95 adapted to receive a locking ring 97. The neck portion 95 has a plate 96, formed with a threaded bore, secured thereto and held thereon by the locking ring 97. The plate 96 is adapted to rotate with the retainer 83 when the said retainer is rotated by turning the disc 94.

The upper edge of the plate 96 is provided with a scale 98 (Figs. 1, 2 and 4) which is adapted to register with index marks 99 provided on the upper portion 79 of the upright 78 to indicate the extent of rotary movement of the plate 96.

The lower end of the plate 96 has one end of a connecting plate 100 welded or otherwise fixedly connected thereto and extending in a direction toward the target holding means 24. The other end of the connecting plate 100 is similarly connected to the lower end of a substantially U-shaped member 101, the branches 102 of which extend upwardly and carry at their respective ends lens engaging members 103 which extend toward the plate 96 substantially equidistant from and parallel with the optical axis of the system. The members 103 and portions 91 are substantially equally spaced from the optical axis of the system and are disposed in substantially right angular relation with each other.

Thus, when the operator pulls the disc 94 to retract the rods 90, a lens 73 or similar article to be tested can be inserted between the lens engaging portions 91 and the members 103, and upon release of the disc 94 the springs 92 will urge the portions 91 into engagement with one surface of the lens 73 while the members 103 engage the opposed surface thereof to retain the lens securely in place.

The ends of the lens engaging portions 91 and lens engaging members 103 are rounded to provide four concentrically arranged points of suspension so that all conventionally shaped lenses and some specially shaped lens may be properly supported in the instrument.

The supporting plate 74 rotates about the axis of the pivot member 75 and has wide area surface engagement with the machined surface 111 formed on the upper face of the portion 112 of the telescope supporting arm 21. The portion 112 is provided with a circular recess 113 in which is located a depending portion of the plate 74. The pivot member 75 is mounted in spaced ball bearings 113a carried within a bore 114 formed in a thickened portion 115 of the wall of the base 20. The upper end of the portion 115 is formed with an annular raised portion 115a which is adapted to interfit with an annular groove formed in the adjacent surface of the end portion 112 to aid in preventing foreign matter from gaining access to the bearings 113a.

The upper end of the pivot member 75 is provided with a threaded portion 116 of reduced diametrical size which extends through the portion 112 and is connected thereto by a nut 117. The extreme end portion 118 of the threaded portion 116 extends through the plate 74, the plate 74 being rotatably connected thereto by screw and washer means 119. The pivot member 75 is provided with an enlarged integral flange 120 adjacent the junction of the threaded portion 116 with said member 75. The flange 120 is provided with a machined surface for engagement with the adjacent surface of the inner race of the upper ball bearing 113. Thus, the arm 21 and/or the lens supporting device 23 rotate about the axis of the pivot member 75.

Figure 9:
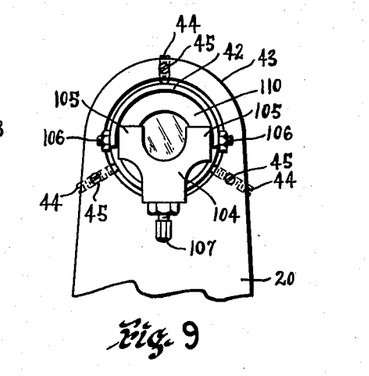
Fig. 9 is a front elevational view of the lens locating device.

In accordance with this invention, when a lens 73 is positioned in the instrument as shown in Fig. 10, its optical center is aligned with the optical axis of the device. The apex of the rear surface of the lens is then preferably located at the point of intersection of the center line of the pivot member 75 with said optical axis, which point is referred to herein as the reference point. To perform this adjustment the adjacent end of the target barrel 42 is provided with a pivoted locating member 104 (Figs. 9 and 10) which embodies a somewhat V-shaped body having its arms 105 pivotally connected as by adjustable pivots 106 within the end of the barrel 42. The apex of the locating member 104 normally depends from the pivots 106 as shown by dotted lines in Fig. 10, and has secured thereto an adjustable stop 107. The locating member 104 is adapted to be manually swung upwardly to the position shown by full lines in Fig. 10 wherein the stop 107 will be located substantially on the axis of the optical system at the point where the center line of the pivot member 75 intersects said axis. A spring device is included to retain the locating member 104 in extended position and includes a ring member 108 which is fixedly mounted in the barrel 42 adjacent the lens retaining ring 60a. A coiled spring 109 engages the ring 108 at one end and at its other end is engaged by a flanged apertured disc 110. In operation of the device, as the locating member 104 is swung upwardly, the extreme flat ends of the arms 105 thereof will engage the disc 110 and urge it farther into the barrel 42 against the tension of the spring 109. Frictional engagement of the disc 110 with the flat ends of the arms 105 will retain the member 104 in horizontal position.

Figure 4:
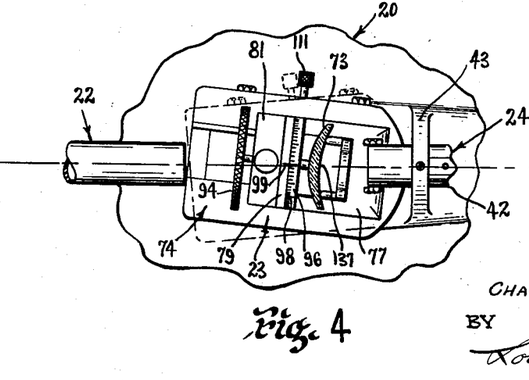
Fig. 4 is a fragmentary top-plan view of the lens supporting means.

When the locating member 104 is positioned parallel to the optical axis, the lens holding device 23 is moved longitudinally in the ways 76 formed in the plate 74 until the stop 107 is engaged by the apex of the adjacent surface of the lens 73. The block 77 is then secured in adjusted position on the base 74 by means such as thumb screw 111 (Figs. 2 and 4).

The member 104 is then moved downwardly to normal inoperative position whereupon the operator can sight through the telescope 22, lens 73, and lenses 63 and 64 to the target 53.

It is particularly pointed out that when the locating member 104 is in raised position, the distance between the end of the stop 107 and the standard lens system 63—64 and the power of said standard lens system are so controlled that the dioptric power reading of the instrument for the lens under test will be the same as the effective dioptric power of said lens when positioned before the eye and at the standard distance from the cornea as established in the ophthalmic art. This distance is approximately 13.75 millimeters.

Figure 16:
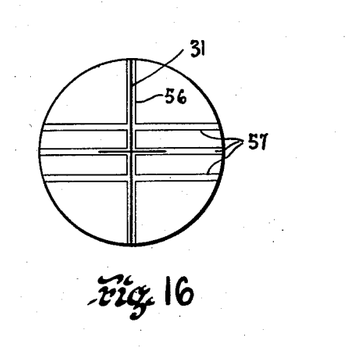
Figs. 16 and 17 are representations of images seen by the operator when testing a lens.
Figure 17:
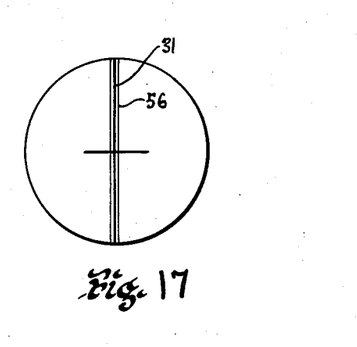

At this time the target is moved longitudinally in the barrel 42 to the position where one or both sets of lines 56 and 57 are most clearly discernible, and the reading registered by the index mark 59 on scale 58 will indicate the dioptric power, if any, of the lens 73 in the focused meridian. When measuring the power of a lens 73 the selected lines of the image, as shown in Figs. 16 and 17, should be brought clearly into focus. In cases where the lens 73 has little or no power, both sets of the lines 56 and 57 will be visible (Fig. 16). However, in cases where a lens has different meridianal power, only the set of lines in the meridian being tested should be brought into focus, such as line 51 in Fig. 17. The above, although providing for the determination of dioptric power, is the initial step leading to the measurement only of the shape magnification of the lens.

Since the lens 73 has been previously located by means of the adjustable stop 107, as described hereinbefore, so that the apex of the rear surface of the lens is located on the axis of the pivot member 75, any rotary movement of the arm 21 and the lens supporting device 23 will consequently cause rotation of the telescope 22 and lens 73 about said apex.

Figure 14:
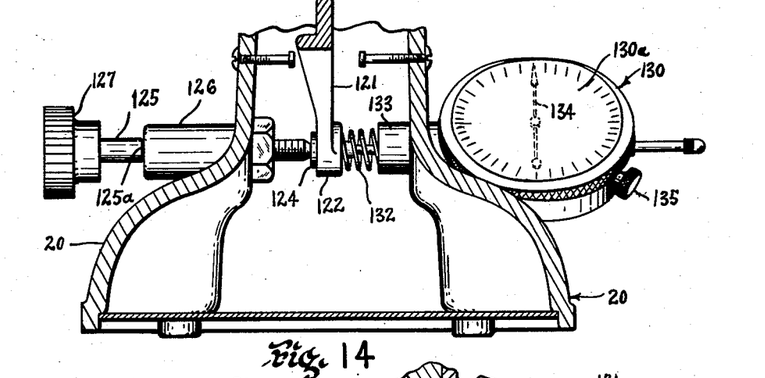
Fig. 14 is an enlarged sectional view taken on line 14—14 of Fig. 1 looking in the direction of the arrows.
Figure 15:
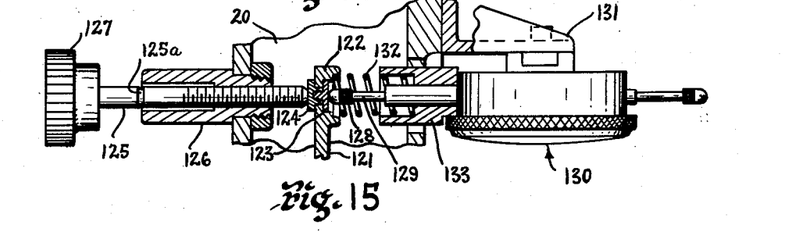
Fig. 15 is an enlarged fragmentary sectional view taken approximately on line 15—15 of Fig. 1 looking in the direction of the arrows.

The means for moving the arm 21 includes an extension 121 formed integral with or attached to the portion 112 of the arm 21 (Figs. 3, 14 and 15). The portion 122 of the extension 121 is provided with a transverse bore for reception of the central portion of a contactor assembly comprising a pair of spaced hardened discs 123 and 124 having short hubs threadedly connected together as shown in Fig. 15. The hardened disc 124 is adapted to be engaged by the end of a threaded shaft 125 which is threadedly mounted for movement toward and away from the disc 124 in a retainer 126 carried by the wall of the base 20. The shaft 125 extends through the base 20 and the outer end thereof carries a knob 127 whereby the shaft 125 can be threaded inwardly of the base 20 to move the extension 121 and consequently the entire arm 21. The other disc 123 is positioned within a recess formed in the end portion 122 of the extension 121 and is adapted to be engaged by the end portion 128 of an operating plunger 129 forming a part of an indicator device 130 which is adjustably secured onto the outside of the base 20 by means of a bracket 131. A coiled spring 132 is mounted over the plunger 129 and has one end positioned within a retainer 133 mounted adjacent the indicator device 130, the other end of the spring 132 being positioned within the recess in the end portion 122 of the extension 121. Thus the spring 132 constantly urges the extension 121 toward the shaft 125.

The indicator device 130 is of any conventional type wherein an indication is made of longitudinal movement of the plunger 129. The preferable type embodies a rotatable dial 130a which can be adjusted as desired with respect to an indicator 134 and locked in adjusted position by means such as a thumb screw 135. Spring mechanism (not shown) within the indicator device serves to maintain the end portion 128 of the plunger 129 in constant engagement with the disc 123. A substantial zero location of the arm 21 is indicated by a circumferential groove 125a formed on the shaft 125 and adapted to register with the end of the retainer 126. Thus, as the knob 127 is manually rotated to adjust the position of extension 121 and consequently the arm 21, telescope 22, and lens 73, the adjustment will be indicated by the indicator device 130.

The lens supporting device 23 is, as has been stated, also independently adjustable about the axis of the pivot 75. This is illustrated in Fig. 4 wherein solid lines show the lens supporting device 23 angled to one side of the axis of the system, which axis is indicated by line 136, and dot and dash lines indicate the position of the plate 74 when the device is angled to the opposite side of the axis 136.

It is to be understood, however, that the apex of the rear surface of the lens 73 always remains on the axis 136 at the point 137 where the axis 136 is intersected by the center line of the pivot member 75.

Means is provided for locating and retaining the plate 74 in any one of three positions upon the arm 21 and embodies three spaced notches 138 (Figs. 3 and 13) which are formed in the under side of the plate 74 on the end thereof directed toward the operator. The notches 138 are adapted to be engaged by a beveled locating pin 139 which is adapted to reciprocate within a bushing 140 carried in the upper side of the hollow arm 21. A spring 141 mounted over a reduced portion of the pin 139 and engaging a shoulder thereon constantly urges the pin toward the notches 138. A short lever 142, which is pivoted within the arm 21 as at 143, has one end engaging the pin 139 in such a manner that pivotal movement of the lever 142 will cause the pin 139 to move toward or away from the notches 138. This pivotal movement of the lever 142 is brought about through its engagement with the head portion 144 of a push button 145 which is slidably mounted within a retainer 146 threadedly carried by the lower side of the arm 121. Thus, manual operation of push button 145 will cause the lever 142 to move the pin 139 downwardly out of engagement with the notches 138, and release of the push button 144 will permit the spring 141 to move the pin 139 toward the notches 138.

The middle notch 138 is adapted to automatically align the lens supporting structure 23 with the telescope 22. The other notches 138 are so located that the pin 139 will engage them when the lens supporting device 23 is moved through an angle of preferably 5° either side of the optical axis 136 of the instrument. The exact spacing of the outer notches is immaterial, it being necessary, however, that they both be located at the same distance from the middle notch to permit the lens 73 to be positioned at the same angle on each side of the axis 136.

After the lens 73 has been positioned in the supporting device 23 and the dioptric power in the vertical meridian is measured by moving the target 53 as described hereinbefore, the lens supporting device is first angled 5° to the right side of the axis 136. This will cause the image of the vertical line 56 of the target 53 to be located to the right side of the vertical hairline 31 of the reticule 30. At this time the knob 127 is rotated by the operator to cause the telescope 22 and lens 73 to be moved about the axis of the pivot member 75 an extent sufficient to again align the image of the line 56 with hairline 31. The indicator device 130 is then set at zero. The lens supporting device 23 is then moved to the setting of 5° on the opposite side of the axis 136. This will cause the image of the line 56 to move to the left of the hairline 31. The knob 127 is again rotated to realign the image of the line 56 with hairline 31, and the resultant reading on the indicator device gives the per cent magnification of the lens 73 in the meridian under test. It is to be understood that the angular displacement of the lens and the effective length of the arm 121 are so controlled as to enable the dial gauge to directly indicate the adjustments, as accomplished by rotation of the knob 127, in per cent magnification.

In order to find the magnification of the lens 73 in the opposite major meridian, the lens 73 in the supporting structure 23 must be rotated 90° with respect to its first position as described hereinbefore. The vertical image line 56 must be again brought into focus by moving the target 53, which gives the dioptric power of the lens in said meridian on the scale 58. Then by repeating the operations described in the preceding paragraph the per cent magnification of the lens 73 in the said opposite meridian can be determined.

While the above enables the determination of the dioptric power and shape magnification of the lens independently of magnification due to power in the major meridians of the lens and thereby enables one to accurately determine dioptric power and shape magnification of prescriptive lenses as when supported in a predetermined fixed standard established position before the eyes, it might be desirable, in instances when the prescriptive lenses are going to be supported at a position other than standard, to know what the effective dioptric power and total magnification of the lens will be at said position.

Figure 1:
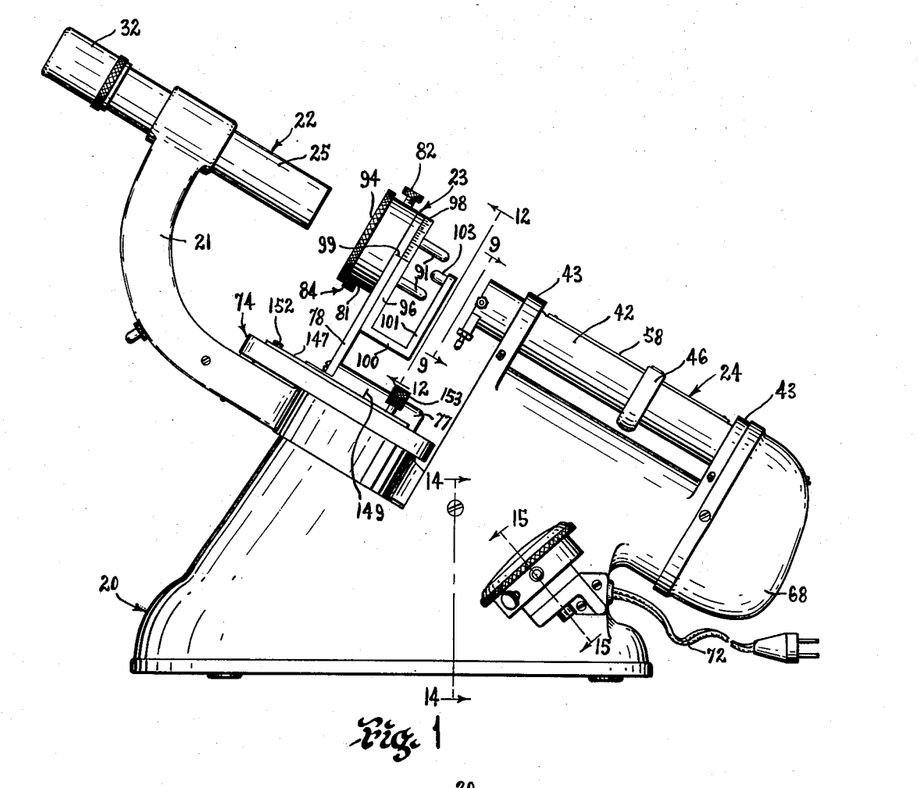
Fig. 1 is a side elevational view of an instrument embodying the invention.

In order to measure the effective dioptric power and total magnification at said different positions, the instrument embodying the invention is provided with a scale 147 mounted on the upper surface of the plate 74, see Figs. 1 and 2. This scale 147 is graduated in millimeters as diagrammatically illustrated at 148 and functions cooperative with an indicator line 149 positioned on the side of the block 77 which is slideably mounted in the plate 74 as previously described above. The scale 147 is provided with longitudinal slots 150 and 151 adjacent the opposed ends thereof and is adjustably secured to the plate 74 by means of a screw 152 extending through the slot 150 and a thumb screw 153 which extends through the slot 151.

In making such measurements, the lens under test held by the lens-holding mechanism of the device as previously described above, after having its optical center properly aligned with the optical axis of the instrument, is first moved to position the apex of its rear surface into engagement with the end 107 which establishes the initial reference point or normal standard wearing distance. The scale 147 is then moved with respect to the plate 74, by first loosening the thumb screw 153 to position the zero scale line thereon in alignment with the reference line 149. The scale is then locked in position by tightening the thumb screw 153 and the block 77 carrying the lens supporting mechanism is then moved longitudinally of the slideway in the plate 74 a controlled amount as determined by the scale 147 in accordance with the position at which the lens is to be actually supported before the eyes. This adjustment is equal to that of the "off" position of the lens from the normal standard established distance. The effective dioptric power is then determined in a manner similar to that described above and the magnification factors of the lens is determined in a manner similar to that described above in determining shape magnification. However, the magnification reading, as obtained from the indicating device 130 will now give shape magnification plus power magnification as introduced by the "off" position of the apex of the rear surface of the lens from that of the normal distance.

From the foregoing description, it will be seen that simple, efficient, and economical means have been provided for accomplishing all of the objects and advantages of the invention.

It is pointed out that all of the operative parts of the instrument are self-contained in a device which is conveyable and which will occupy a minimum amount of space.

While the novel features of the invention have been shown and described and are pointed out in the annexed claims, it will be understood that various omissions, substitutions, and changes in the invention and widely different embodiments of the invention can be made without departing from the scope thereof, and it is intended that all matters contained in the above description and shown in the accompanying drawing be interpreted as illustrative and not in a limiting sense.

I claim:

1. An instrument of the character described comprising a support, viewing means having a reticule mounted on said support, target means mounted on said support and embodying image-forming means normally positioned substantially in axial alignment with the optical axis of the instrument, means for illuminating said target means, means for directing light rays from said illuminated target means along said optical axis to render an image thereof visible in the plane of the reticule, supporting means on said support for holding a lens system to be tested between said reticule and target and in the path of the light rays at a position so related with said target as to prevent any change of said rays due to the power of said lens system, means for independently adjusting said supporting means and lens system to given angular positions on the opposite sides of said optical axis to cause the light rays to be displaced controlled amounts on said opposite sides according to the optical characteristics of the lens system under test, said means comprising a plate member on which said supporting means is mounted, a pivot member carried by said support and having said plate member attached thereto, and locating means on said support and plate for retaining said plate and supporting means in desired adjusted position with respect to the axis of said pivot member, said plate member having slideways formed therein for slidable reception of said supporting means, and said target means having adjustable stop means thereon for engagement by said lens system to be tested whereby said lens system to be tested may be adjusted to a predetermined position with respect to said target means, adjustment means for moving the reticle and image of the target into aligned relation with each other while viewing said reticle and image through the lens system under test at said respective angular positions, and indicating means for determining the range of adjustment required to bring about said alignments.

2. An instrument of the character described comprising a support, viewing means having a reticle mounted on said support, target means mounted on said support and embodying image-forming means normally positioned substantially in axial alignment with the optical axis of the instrument, means for illuminating said target means, means for directing light rays from said illuminated target means along said optical axis to render an image thereof visible in the plane of the reticle, supporting means on said support for holding a lens system to be tested between said reticle and target and in the path of the light rays at a position so related with said target as to prevent any change of said rays due to the power of said lens system, means for independently adjusting said supporting means and lens system to given angular positions on the opposite sides of said optical axis to cause the light rays to be displaced controlled amounts on said opposite sides according to the optical characteristics of the lens system under test, said means comprising a plate member on which said supporting means is mounted, a pivot member carried by said support and having said plate member attached thereto, the axis of said pivot member intersecting the axis of said target means, and locating means on said support and plate for retaining said plate and supporting means in desired adjusted position with respect to the axis of said pivot member, said plate member having slideways formed therein for slidable reception of said supporting means, and said target means having adjustable stop means thereon for engagement by said lens system to be tested whereby said lens system to be tested may be adjusted to a predetermined position where the apex of the surface thereof directed toward said target means will be positioned substantially on said optical axis at the point of intersection by the axis of said pivot member, adjustment means for moving the reticle and image of the target into aligned relation with each other while viewing said reticle and image through the lens system under test at said respective angular positions, and indicating means for determining the range of adjustment required to bring about said alignments.

3. An instrument of the character described comprising a base, a support mounted on said base for adjustment about a pivot whose axis intersects the optical axis of the instrument at approximately right angles, viewing means having a reticle mounted on said support to one side of said pivot and target means mounted on said base on the other side of the pivot and embodying image-forming means normally positioned substantially in axial alignment with the optical axis of the instrument, means for illuminating said target means, means for directing light rays from said illuminated target means along said optical axis to render an image thereof visible in the plane of the reticle, supporting means adjustably mounted on said support for movement about the axis of said pivot and having means holding a lens system to be tested between said reticle and target and in the path of the light rays at a position adjacent the axis of said pivot and so related with said target as to prevent any change of said rays due to the power of said lens system, said supporting means comprising an upright having lens holding means thereon, said holding means being rotatable in said upright for permitting said lens system to be tested to be rotated substantially about the said optical axis in order to determine optical characteristics thereof in various meridians and embodying indicating means for registering the adjustment of said holding means in said upright, means for independently adjusting said supporting means and lens system about said axis of the pivot to given angular positions on the opposite sides of said optical axis to cause the light rays to be displaced controlled amounts on said opposite sides according to the optical characteristics of the lens system under test, and means for retaining said supporting means on the support in said adjusted position, adjustment means for moving the support to bring the reticle and image of the target into aligned relation with each other while holding the lens system under test at said respective angular positions on the support comprising control means operatively connected to a portion of said support for permitting adjustment of said support about said pivot, and indicating means operatively attached to said support for registering the range of adjustment required of said support and consequently of said lens system to be tested to bring about said alignments.

4. An instrument of the character described comprising a base, a support mounted on said base, viewing means having a reticle mounted on said support, target means mounted on said base and embodying image-forming means normally positioned substantially in axial alignment with the optical axis of the instrument, means for illuminating said target means, means for directing light rays from said illuminated target means along said optical axis to render an image thereof visible in the plane of the reticle, supporting means mounted on said support for holding a lens system to be tested between said reticle and target and in the path of the light rays at a position so related with said target as to prevent any change of said rays due to the power of said lens system, means for independently adjusting said supporting means and lens system to given angular positions on the opposite sides of said optical axis to cause the light rays to be displaced controlled amounts on said opposite sides according to the optical characteristics of the lens system under test, said means comprising a plate member on which said supporting means is mounted, a pivot member carried by said support and having said plate member attached thereto, the axis of said pivot member intersecting the axis of said target means, and locating means on said support and plate for retaining said plate and supporting means in desired adjusted position with respect to the axis of said pivot member, said plate member having slideways formed therein for slidable reception of said supporting means, and said target means having adjustable stop means thereon for engagement by said lens system to be tested whereby said lens system to be tested may be adjusted to a predetermined position where the apex of the surface thereof directed toward said target means will be positioned substantially on said optical axis at the point of intersection by the axis of said pivot member, said support being mounted on the base for movement about the axis of said pivot member whereby the reticule and image of the target may be brought into aligned relation with each other while viewing said reticule and image through the lens system under test at said respective angular positions, control means operatively connected to a portion of said adjustable support for permitting adjustment of said support about the axis of said pivot member, and indicating means operatively attached to said support for registering the range of adjustment required for said support and consequently of said lens system to be tested to bring about said alignments.

5. An instrument of the character described comprising a base, a support mounted on said base, viewing means having a reticule mounted on said support, target means mounted on said base and embodying image-forming means normally positioned substantially in axial alignment with the optical axis of the instrument and movable longitudinally of said optical axis whereby it may be properly focussed for viewing through said viewing means, means for illuminating said target means, means for directing light rays from said illuminated target means along said optical axis to render an image thereof visible in the plane of the reticule, supporting means on said support for holding a lens system to be tested between said reticule and target and in the path of the light rays, means for independently adjusting said supporting means and lens system to given angular positions on the opposite sides of said optical axis to cause the light rays to be displaced controlled amounts on said opposite sides according to the optical characteristics of the lens system under test, said means comprising a plate member on which said supporting means is mounted, a pivot member carried by said support and having said plate member attached thereto, the axis of said pivot member intersecting the axis of said target means, and locating means on said support and plate for retaining said plate and supporting means in desired adjusted position with respect to the axis of said pivot member, said plate member having slideways formed therein for slidable reception of said supporting means, and said target means having adjustable stop means thereon for engagement by said lens system to be tested whereby said lens system to be tested may be adjusted to a predetermined position where the apex of the surface thereof directed toward said target means will be positioned substantially on said optical axis at the point of intersection by the axis of said pivot member, said support being mounted for adjustment about the axis of said pivot member whereby the reticule and image of the target may be brought into aligned relation with each other while viewing said reticule and image through the lens system under test at said respective angular positions, and indicating means for determining the range of adjustment required to bring about said alignments.

6. An instrument of the character described comprising a base, a support mounted on said base for adjustment about an axis intersecting the optical axis of the instrument, viewing means having a reticule mounted on said support, target means mounted on said base and embodying image-forming means normally positioned substantially in axial alignment with the optical axis of the instrument and movable longitudinally of said optical axis whereby it may be properly focussed for viewing through said viewing means, means for illuminating said target means, means for directing light rays from said illuminated target means along said optical axis to render an image thereof visible in the plane of the reticule, supporting means on said support for holding a lens system to be tested between said reticule and target and in the path of the light rays, said supporting means comprising an upright having holding means thereon, said holding means embodying fixed lens-engaging means for engagement with one side of said lens system to be tested and yieldable engaging means for engagement with the opposed side of the lens system to be tested, said holding means being rotatable in said upright for permitting said lens system to be tested to be rotated substantially about the said optical axis in order to determine optical characteristics thereof in various meridians and embodying indicating means for registering the adjustment of said holding means in said upright, means for independently adjusting said supporting means and lens system to given angular positions on the opposite sides of said optical axis to cause the light rays to be displaced controlled amounts on said opposite sides according to the optical characteristics of the lens system under test, means for retaining the supporting means in its adjusted position on said support, adjustment means for moving the support to bring the reticule and image of the target into aligned relation with each other while holding the lens system under test at said respective angular positions comprising control means carried by the base and operatively connected to a portion of said support for permitting adjustment of said support, and indicating means operatively attached to said support for registering the range of adjustment required of said support and consequently of said lens system to be tested to bring about said alignments.

7. An instrument of the character described comprising a base, a support mounted on the base, viewing means having a reticule mounted on said support, target means mounted on said base and embodying image-forming means normally positioned substantially in axial alignment with the optical axis of the instrument and movable longitudinally of said optical axis whereby it may be properly focussed for viewing through said viewing means, means for illuminating said target means, means for directing light rays from said illuminated target means along said optical axis to render an image thereof visible in the plane of the reticule, supporting means on said support for holding a lens system to be tested between said reticule and target and in the path of the light rays, said supporting means comprising an upright having holding means thereon, said holding means embodying fixed lens-engaging means for engagement with one side of said lens system to be tested and yieldable engaging means for engagement with the opposed side of the lens system to be tested, said holding means being rotatable in said upright for permitting said lens system to be tested to be rotated substantially about the said optical axis in order to determine optical characteristics thereof in various meridians and embodying indicating means for registering the adjustment of said holding means in said upright, means for independently adjusting said supporting means and lens system to given angular positions on the opposite sides of said optical axis to cause the light rays to be displaced controlled amounts on said opposite sides according to the optical characteristics of the lens system under test, said means comprising a plate member on which said supporting means is mounted, a pivot member carried by said support and having said plate member attached thereto, the axis of said pivot member intersecting the optical axis of said instrument, and locating means on said support and plate for retaining said plate and supporting means in desired adjusted position with respect to the axis of said pivot member, said plate member having slideways formed therein for slidable reception of said supporting means, and said target means having adjustable stop means thereon for engagement by said lens system to be tested whereby said lens system to be tested may be adjusted to a predetermined position where the apex of the surface thereof directed toward said target means will be positioned substantially on said optical axis at the point of intersection by the axis of said pivot member, said support being mounted on the base for adjustment about the axis of the pivot member whereby the reticule and image of the target means may be brought into aligned relation with each other while viewing said reticule and image through the lens system under test at said respective angular positions, control means carried by the base and operatively connected to a portion of said support for permitting adjustment of said support about the axis of said pivot member, and indicating means carried by the base and operatively attached to said support for registering the range of adjustment required of said support and consequently of said lens system to be tested to bring about said alignments.

References Cited in the file of this patent

UNITED STATES PATENTS

| Number | Name | Date |
|---|---|---|
| 1,047,000 | De Zeng | Dec. 10, 1912 |
| 2,042,565 | Tillyer | June 2, 1936 |
| 2,107,553 | Tillyer | Feb. 8, 1938 |
| 2,114,282 | Ames, Jr. et al. | Apr. 19, 1938 |